United States Patent
Kim et al.

(10) Patent No.: US 10,070,468 B2
(45) Date of Patent: *Sep. 4, 2018

(54) METHOD AND APPARATUS FOR TRANSMITTING AND RECEIVING MEASUREMENT INFORMATION IN MOBILE COMMUNICATION SYSTEM

(71) Applicant: Samsung Electronics Co., Ltd, Suwon-si (KR)

(72) Inventors: Sang Bum Kim, Suwon-si (KR); Soeng Hun Kim, Suwon-si (KR); Jae Hyuk Jang, Suwon-si (KR); Kyeong In Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/602,013

(22) Filed: May 22, 2017

(65) Prior Publication Data
US 2017/0257903 A1   Sep. 7, 2017

Related U.S. Application Data

(63) Continuation of application No. 14/400,302, filed as application No. PCT/KR2013/004047 on May 9, 2013.
(Continued)

(51) Int. Cl.
*H04W 72/00* (2009.01)
*H04W 76/02* (2009.01)
(Continued)

(52) U.S. Cl.
CPC ......... *H04W 76/027* (2013.01); *H04W 24/10* (2013.01); *H04W 74/002* (2013.01);
(Continued)

(58) Field of Classification Search
CPC ... H04W 48/18; H04W 48/12; H04W 76/027; H04W 80/04
See application file for complete search history.

(56) References Cited

U.S. PATENT DOCUMENTS 8,203,987 B2   6/2012   Ishii et al.
8,649,288 B2   2/2014   He et al.
(Continued)

FOREIGN PATENT DOCUMENTS

CN   101682896       3/2010
CN   101841889 A     9/2010
(Continued)

OTHER PUBLICATIONS

International Search Report dated Aug. 21, 2013 in connection with International Patent Application No. PCT/KR2012/004047, 5 pages.
(Continued)

*Primary Examiner* — Khalid Shaheed
*Assistant Examiner* — K Wilford

(57) ABSTRACT

Disclosed are a method and an apparatus for transmitting and receiving measurement information in a mobile communication system. A terminal transmits a connection request message to a network and reports to the network, connection failure-related measurement information when a registered public land mobile network (RPLMN) included in a connection setup message received from the network corresponds to a pre-stored and selected public land mobile network (PLMN) and the connection failure-related measurement information stored with the selected PLMN is available.

16 Claims, 8 Drawing Sheets

Related U.S. Application Data

(60) Provisional application No. 61/649,910, filed on May 21, 2012, provisional application No. 61/644,645, filed on May 9, 2012.

(51) Int. Cl.

| | |
|---|---|
| *H04W 74/00* | (2009.01) |
| *H04W 24/10* | (2009.01) |
| *H04W 76/18* | (2018.01) |
| *H04W 60/00* | (2009.01) |
| *H04W 24/08* | (2009.01) |
| *H04W 76/19* | (2018.01) |

(52) U.S. Cl.
CPC ......... *H04W 74/008* (2013.01); *H04W 76/18* (2018.02); *H04W 24/08* (2013.01); *H04W 60/00* (2013.01); *H04W 76/19* (2018.02); *Y02D 70/12* (2018.01); *Y02D 70/124* (2018.01); *Y02D 70/126* (2018.01)

(56) References Cited

U.S. PATENT DOCUMENTS

| | | | |
|---|---|---|---|
| 9,237,419 | B2 | 1/2016 | Jung et al. |
| 2004/0147260 | A1* | 7/2004 | Kim ................ H04M 1/274566 455/432.1 |
| 2008/0125043 | A1* | 5/2008 | Karmanenko ........ H04W 12/10 455/41.2 |
| 2010/0093386 | A1 | 4/2010 | Damnjanovic et al. |
| 2010/0317356 | A1 | 12/2010 | Roessel et al. |
| 2011/0051609 | A1 | 3/2011 | Ishii et al. |
| 2011/0080849 | A1* | 4/2011 | Choi ...................... H04W 48/16 370/254 |
| 2011/0177810 | A1* | 7/2011 | Kim ....................... H04W 48/18 455/432.1 |
| 2011/0195668 | A1 | 8/2011 | Lee et al. |
| 2011/0201307 | A1 | 8/2011 | Segura |
| 2011/0276838 | A1 | 11/2011 | Thou et al. |
| 2011/0299415 | A1 | 12/2011 | He et al. |
| 2012/0051297 | A1 | 3/2012 | Lee et al. |
| 2012/0108199 | A1 | 5/2012 | Wang et al. |
| 2013/0070682 | A1 | 3/2013 | Kim et al. |
| 2013/0109320 | A1 | 5/2013 | Tomala et al. |
| 2014/0023032 | A1 | 1/2014 | Kim et al. |
| 2014/0198640 | A1* | 7/2014 | Suzuki ..................... H04L 47/76 370/230 |

FOREIGN PATENT DOCUMENTS

| | | |
|---|---|---|
| EP | 2265077 A1 | 12/2010 |
| KR | 10-2011-0093642 | 8/2011 |
| KR | 10-2011-0139060 | 12/2011 |
| KR | 10-2012-0035114 | 4/2012 |
| RU | 2426251 | 8/2011 |
| WO | WO 2011-038272 | 3/2011 |
| WO | 2011099725 A2 | 8/2011 |
| WO | WO 2011-093666 | 8/2011 |
| WO | WO 2011-155784 | 12/2011 |
| WO | WO 2011-157292 | 12/2011 |
| WO | 2012008691 A2 | 1/2012 |
| WO | 2012-141483 A2 | 10/2012 |
| WO | 2013-051836 A1 | 4/2013 |
| WO | 2013-051912 A2 | 4/2013 |
| WO | 2013-065995 A2 | 5/2013 |

OTHER PUBLICATIONS

Written Opinion of International Searching Authority dated Aug. 21, 2013 in connection with International Patent Application No. PCT/KR2012/004047, 4 pages.
ETSI TS 137 320 V10.1.0, "Radio Measurement Collection for Minimization of Drive Tests (MDT), Overall Description, Stage 2, (3GPP TS 37 320 version 10.1.0 Release10)", Apr. 2011, 19 pages.
Extended European Search Report issued for EP 13787344.4 dated Jan. 21, 2016, 9 pgs.
Huawei et al., "The MDT Applicability of EPLMN", 3GPP TSG-WG2 Meeting #75, R2-114011, Aug. 16, 2011, 16 pgs.
Huawei et al., "Remaining Issue for Accessbility", 3GPP TSG-RAN WG2 Meeting #78, R2-122457, May 15, 2015, 4 pgs.
Decision on Grant dated Nov. 28, 2016 in connection with Russian Application No. 2014127861, 13 pages.
Chinese Office Action dated Feb. 4, 2017 in connection with Chinese Patent Application No. 201380036294.7.
Chinese Office Action dated Dec. 8, 2016 in connection with Chinese Patent Application No. 201280040843.3.
"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)", 3GPP TS 37.320 V10. 4.0, Dec. 2011, 18 pages.
"3rd Generation Partnership Project; Technical Specification Group Radio Access Network Extending 850MHz Study Item Technical Report, (Release 9)", 3GPP TR 37.806 V1.1.0, (2011), 75 pages.
"Multiple frequency band indicators per cell", Ericsson, ST-Ericsson, 3GPP TSG-RAN WG2 #75, Aug. 22-26, 2011, 5 pages, Tdoc R2-114299.
Australian Office Action dated Dec. 21, 2016 in connection with Australian Patent Application No. 2013208385.
InterDigital Communications, "Handling of SCell Activation/De-activation RF Retuning Interruptions", 3GPP TSG RAN WG2 #78, May 21-25, 2012, 13 pages, R2-122289.
Renesas Mobile Europe Ltd., "Considerations on retuning interruptions", 3GPP TSG-RAN WG4 Meeting #63, May 21-25, 2012, 5 pages, R4-123056.
Office Action dated Sep. 5, 2017 in connection with Chinese Patent Application No. 2013800240263.
Office Action dated Sep. 5, 2017 in connection with Chinese Patent Application No. Aug. 22, 2017.
3GPP TR 36.805 V9.0.0 (Dec. 2009) 3rd Generation Partnership Project; Technical Specification Group Radio Access Network; Study on Minimization of drive-tests in Next Generation Networks; (Release 9), 40 pages.
Ericsson, ST-Ericsson, "Accessibility measurements for MDT," 3GPP TSG-RAN WG2 #76, Tdoc R2-116148, San Francisco, CA, USA, Oct. 14-18, 2011, 2 pages.
Communication from a foreign patent office in a counterpart foreign application, "Text of the First Office Action," Chinese Application No. 201380010349.7, May 31, 2017, 14 pages.
Communication from a foreign patent office in a counterpart foreign application, "Notice of Reasons for Refusal," Japanese Application No. 2014-551202, Jun. 5, 2017, 6 pages.
Communication from a foreign patent office in a counterpart foreign application, Australian Government IP Australia, Examination report No. 1 for standard patent application, Application No. AU 2017203059, Jun. 5, 2018, 8 pages.
Communication from a foreign patent office in a counterpart foreign application, Canadian Intellectual Property Office, Office Action, Application No. CN 2,845,779, Jun. 7, 2018, 4 pages.
Communication from a foreign patent office in a counterpart foreign application, European Patent Office, "Communication pursuant to Article 94(3) EPC," Application No. EP 12826373.8, Apr. 13, 2018, 7 pages.
Ericsson, et al., "Multiple frequency band indicators per cell," R2-114301, GPP TSG-RAN2 Meeting #75, Athens, Greece, Aug. 22-26, 2011, 8 pages.
"23.1 RRC Connection Establishment," Long Term Evolution (LTE), www.lte-bullets.com, published Aug. 12, 2011 per WayBack Machine, 4 pages.
3GPP TS 36.101, V10.3.0 (Jun. 2011), Technical Specification, 3rd Generation Partnership Project; Technical Specification Group Radio Access Network; Evolved Universal Terrestrial Radio Access

(56) References Cited

OTHER PUBLICATIONS (E-UTRA); User Equipment (UE) radio transmission and reception (Release 10), Jun. 21, 2011, 237 pages, XP050553331.

\* cited by examiner

METHOD AND APPARATUS FOR TRANSMITTING AND RECEIVING MEASUREMENT INFORMATION IN MOBILE COMMUNICATION SYSTEM

CROSS-REFERENCE TO RELATED APPLICATION(S)

The present application is a continuation of U.S. Pat. application Ser. No. 14/400,302 filed on Nov. 10, 2014, which claims priority under 35 U.S.C. § 365 to International Patent Application No. PCT/KR2013/004047 filed May 9, 2013, entitled "METHOD AND APPARATUS FOR TRANSMITTING AND RECEIVING MEASUREMENT INFORMATION IN MOBILE COMMUNICATION SYSTEM". International Patent Application No. PCT/KR2013/004047 claims priority under 35 U.S.C. § 365 and/or 35 U.S.C. § 119(e) to United States Provisional Patent Application No. 61/649,910 filed May 21, 2012, and United States Provisional Patent Application No. 61/644,645 filed May 9, 2012,which are incorporated herein by reference into the present disclosure as if fully set forth herein.

TECHNICAL FIELD

The present invention relates to a method and apparatus for transmitting and receiving measurement information in a mobile communication system and, more particularly, to a method for measuring, at a terminal, a radio channel and reporting measurement information to a network.

BACKGROUND ART

Normally a mobile communication system has been developed for the purpose of providing a communication based on user's mobility. With the rapid growth of technologies, this mobile communication system has reached a stage capable of offering a high-speed data communication service beyond a voice communication.

Recently the standardization of LTE-A (Long Term Evolution-Advanced), which is one of next-generation mobile communication systems, has been performed in 3GPP. Targeting complete standardization around the late 2010, LTE-A has realized a high-rate packet-based communication having a higher transmission rate than a previous available data transmission rate.

With the progress of 3GPP standards, a solution to the simple optimization of a radio network has been discussed in addition to a solution to the increase of communication speed. Generally, at the initial construction of a radio network or at the network optimization, a base station or base station controller should collect radio environment information about its own cell coverage. This is referred to as a drive test.

A typical drive test is very time-consuming and laborious task that requires an operator to carry measurement equipment on a vehicle and to repeatedly conduct a measurement process for a long time. Measurement results are analyzed and then used to configure system parameters of a base station or base station controller. Such a drive test increases radio network optimization costs and operation costs, incurring much time consumption.

Therefore, studies of minimizing a drive test and of improving a radio environment analysis process and manual configuration are made in the name of MDT (Minimization of Drive Test). Specifically, the terminal that measures a radio channel transmits radio channel measurement information to the base station periodically or immediately in response to a specific event or after a predetermined time has elapsed from the time point when the radio channel measurement information is logged.

This operation, performed at the terminal, of transmitting the radio cell measurement information and any other additional information to the base station may be referred to as an MDT measurement information report. If a communication with the base station is available, the terminal transmits the channel measurement results to the base station immediately. If an immediate report is unavailable, the terminal logs the MDT measurement information and, when a communication becomes available, reports the logged MDT measurement information to the base station. Then, for the cell area optimization, the base station uses the MDT measurement information received from the terminal.

By the way, in MDT, the terminal performs measurements in an idle mode after establishing a connection with the network and receiving measurement-related configuration information. Therefore, in case of a failure in connection with the network, the terminal neither performs measurements nor transmits measurement information. However, the network may need measured information associated with a connection failure.

DISCLOSURE OF INVENTION

Technical Problem

The present invention is to attain a technical solution for providing a method in which user equipment can suitably report, to a network, measurement information associated with a case in which the terminal fails to connect with the network.

Solution to Problem

In an embodiment of the present invention for accomplishing the above technical solution, a method for reporting, at a terminal, measurement information to a network comprises transmitting a connection request message to the network; receiving a connection setup message from the network in response to the connection request message; determining whether a RPLMN (Registered Public Land Mobile Network) included in the connection setup message is identical to a Selected PLMN logged in advance and whether there is measurement information associated with a connection failure logged together with the Selected PLMN; and if the RPLMN is identical to the Selected PLMN and if the measurement information associated with the connection failure is logged, reporting the measurement information associated with the connection failure to the network.

In an embodiment of the present invention for accomplishing the above technical solution, a method for receiving, at a base station, a report of measurement information from a terminal comprises receiving a connection request message from the terminal; transmitting a connection setup message to the terminal in response to the connection request message; receiving from the terminal a connection setup complete message including an indication indicating that measurement information associated with a connection failure is logged; determining whether to receive the measurement information associated with the connection failure from the terminal; if it is determined to receive the measurement information associated with the connection failure, transmitting to the terminal a UE information request message including an indication requesting the measurement information associated with the connection failure; and receiving from the terminal a UE information response message including the measurement information associated with the connection failure.

In an embodiment of the present invention for accomplishing the above technical solution, a terminal for reporting measurement information to a network comprises a transceiver unit configured to transmit or receive a message to or from the network; and a control unit configured to control the transceiver unit to transmit a connection request message to the network, to receive a connection setup message from the network in response to the connection request message, to report measurement information associated with a connection failure to the network if a RPLMN (Registered Public Land Mobile Network) included in the connection setup message is identical to a Selected PLMN logged in advance and if there is the measurement information associated with the connection failure logged together with the Selected PLMN.

In an embodiment of the present invention for accomplishing the above technical solution, a base station for receiving a report of measurement information from a terminal comprises a transceiver unit configured to transmit or receive a message to or from the terminal; and a control unit configured to control the transceiver unit to receive a connection request message from the terminal, to transmit a connection setup message to the terminal in response to the connection request message, to receive from the terminal a connection setup complete message including an indication indicating that measurement information associated with a connection failure is logged, to determine whether to receive the measurement information associated with the connection failure from the terminal, to transmit to the terminal a UE information request message including an indication requesting the measurement information associated with the connection failure if it is determined to receive the measurement information associated with the connection failure, and to receive from the terminal a UE information response message including the measurement information associated with the connection failure.

Advantageous Effects of Invention

According to a method and apparatus for transmitting and receiving measurement information in a mobile communication system of the present invention, a terminal logs and reports measurement information, system information, etc. even in case of a failure in connection with a network, so that the network can use usefully such information for the optimization of a radio network.

MODE FOR THE INVENTION

Hereinafter, preferred embodiments of the present invention will be fully described with reference to the accompanying drawings. It should be noted that like numerals are used for like and corresponding parts of such drawings. Additionally, well known function and configuration will be not described in detail to avoid obscuring the essence of the present invention.

Although embodiments of this invention will be described mainly on the basis of OFDM-based radio communication system, especially 3GPP EUTRA standards, the subject matter of this invention may be applied to any other communication system having a similar technical background and channel form without departing from the scope of this invention as will be understood by those skilled in the art.

Before embodiments of this invention are described in detail, the performance of MDT by a terminal is described first of all.

Figure 1:
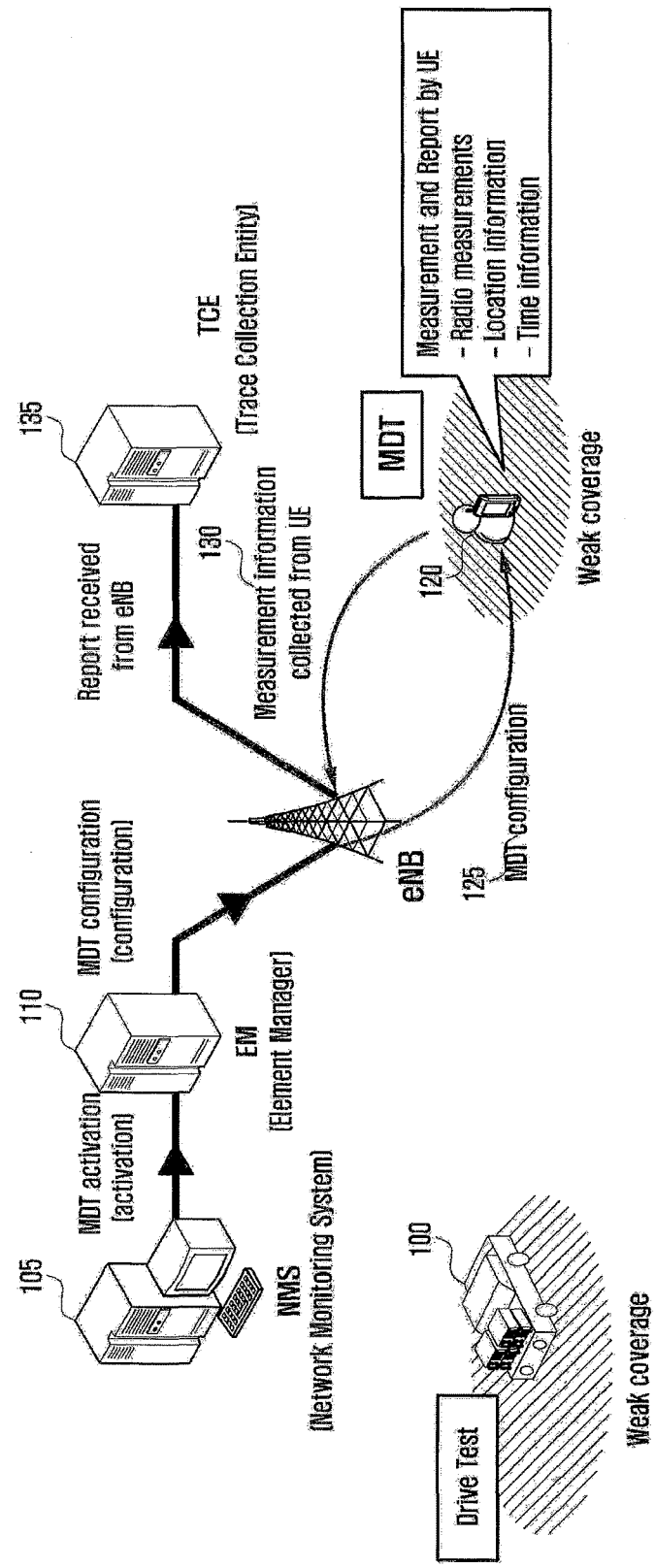
FIG. 1 is a diagram illustrating a concept of performing MDT.

FIG. 1 is a diagram illustrating a concept of performing MDT.

Referring to FIG. 1, a conventional drive test 100 is to carry measurement equipment on a vehicle and to measure a signal status, traveling all over a service area to find a radio shadow region. In MDT, UE (User Equipment, also referred to as a terminal) 120 performs this task. An NMS (Network Monitoring System) 105 may instruct the performance of MDT. At this time, required configuration information is offered to an EM (Element Manager) 110. The EM creates MDT configuration and then transmits it to eNB (eNodeB, also referred to as a base station) 115.

The eNB 115 sends MDT configuration to the UE 120 at step 125 and instructs MDT. The UE 120 collects MDT measurement information in response to instructions of the eNB 115. MDT measurement information may include location and time information as well as signal measurement information. Such collected information is reported to the eNB 115 at step 130. The eNB 115 transmits the collected information to a TCE (Trace Collection Entity) 135. The TCE 135 is a server that collects MDT measurement information.

Figure 2:
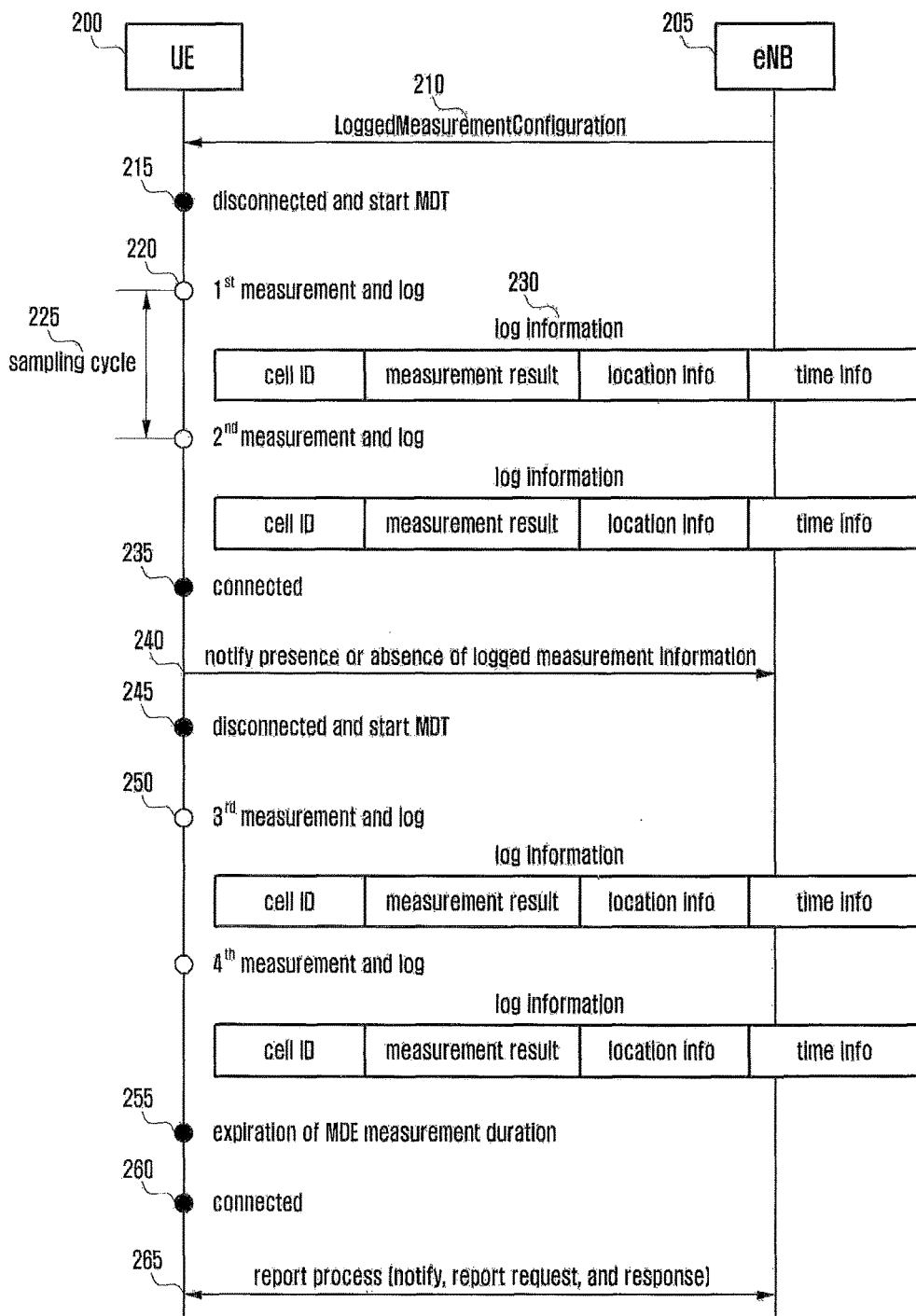
FIG. 2 is a flow diagram illustrating an MDT measurement process performed at a terminal.

FIG. 2 is a flow diagram illustrating an MDT measurement process in which a terminal logs measurement information in an idle mode and then reports the measurement information in a connected mode.

Referring to FIG. 2, at step 210, eNB 205 transmits information required for configuring MDT, i.e., channel measurement configuration information (hereinafter, MDT configuration), through a LoggedMeasurementConfiguration message to UE 200 which is in the connected mode. The MDT configuration includes therein at least one of absolute time reference information, sampling cycle, measurement duration, and MDT PLMN (Public Land Mobile Network) list.

The sampling cycle is used for a periodic measurement of a downlink pilot signal, and the UE 200 collects and logs MDT measurement information in a given cycle. The measurement duration is the total time required for the UE 200 to perform MDT. The MDT PLMN list is a list of PLMNs to which the UE 200 can report MDT measurement information. When specific time corresponding to the measurement duration passes, the UE 200 stops performing MDT.

If an RRC state of the UE 200 is changed to the idle mode from the connected mode, the UE 200 starts performing MDT at step 215. After initially performed at step 220, the MDT measurement and log are then performed in a given sampling cycle 225.

The MDT measurement information is logged for each measurement sample at step 230. The logged MDT measurement information may include therein the ID of a serving cell (i.e., Global cell ID), channel measurement information of a serving cell (i.e., RSRP/RSRQ value, etc.), channel measurement information of neighbor cells, UE location information, relative time information, and the like.

When the UE 200 enters the connected mode at step 235, the UE 200 notifies the presence or absence of logged MDT measurement information to the eNB 205 at step 240. Depending on circumstances, the eNB 205 may request a report. If there is a request, the UE 200 reports the logged MDT measurement information to the eNB 205 and deletes the reported information. If there is no request, the UE 200 retains the logged information continuously.

The UE 200 enters again the idle mode at step 245 and, if the measurement duration has not expired, continuously performs the MDT operation to collect MDT measurement information at step 250. The measurement duration may consider or not a specific time for which the UE 200 is in the connected mode.

When the measurement duration expires, the UE 200 stops performing MDT at step 255. After entering the connected mode at step 260, at step 265 the UE 200 notifies the presence of further logged MDT measurement information to the eNB 205 and, if there is a request for measurement information from the eNB 205, reports the logged MDT measurement information.

Figure 3:
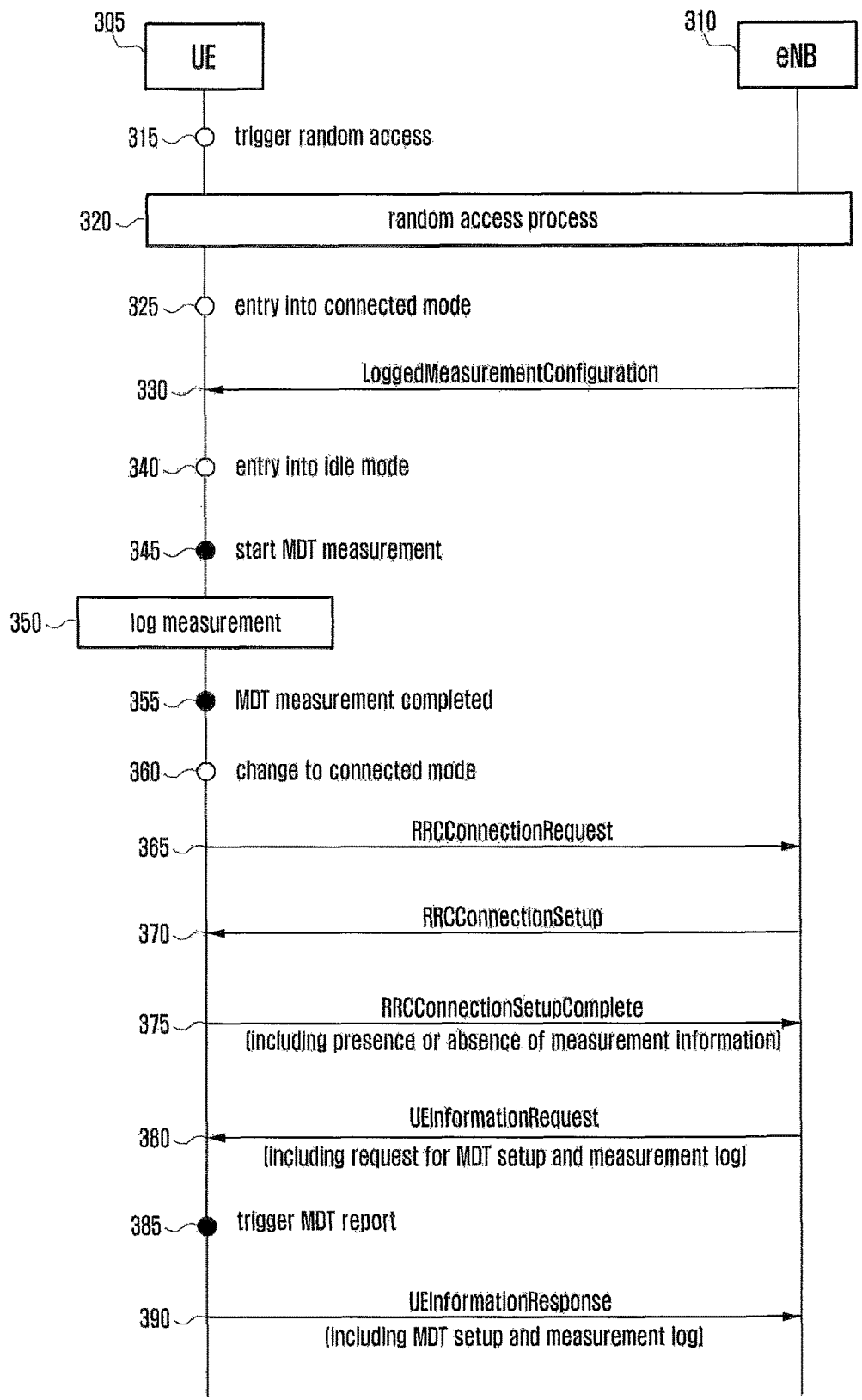
FIG. 3 is a diagram illustrating a detailed process of reporting, at a terminal, logged channel measurement information in response to a request of a base station.

FIG. 3 is a diagram illustrating a detailed process of reporting, at a terminal, logged channel measurement information in response to a request of a base station.

Referring to FIG. 3, UE 305 triggers an access attempt for a communication with eNB 310 at step 315 and attempts a random access at step 320. Thereafter, the UE 305 enters the connected mode at step 325. Then, at step 330, the eNB 310 transmits information required for performing MDT in the idle mode, i.e., channel measurement configuration information, to the UE 305 through a LoggedMeasurementConfiguration message.

Thereafter, the UE 305 is changed to the idle mode at step 340 and, when the MDT measurement duration starts at step 345, performs an MDT measurement at step 350. When the measurement duration expires, the UE 305 stops the MDT measurement at step 355.

Then, the UE 305 determines a change to the connected mode at step 360 and sends an RRCConnectionRequest message to the eNB at step 356. In case of being permissible, the eNB 310 transmits an RRCConnectionSetup message to the UE 305 at step 370. The UE 305 entered the connected mode notifies the presence of the channel measurement information logged in the idle mode to the eNB 310 at step 375. For this, an indication is included in an RRCConnectionSetupComplete message and transmitted.

The UE 305 does not transmit the indication for indicating the presence of the channel measurement information to all PLMNs, but transmits it when a current RPLMN (Registered PLMN) is contained in an MDT PLMN list received from the eNB. In case of handover, the indication may be included in an RRCConnectionReconfigurationComplete message. The reason for transmitting the indication is to notify the presence of the MDT measurement information logged by the UE 305 to the eNB 310 such that the eNB 310 can determine whether to request or not transmission of the MDT measurement information.

Normally the UE 305 may log a large amount of channel measurement information since it stays in the idle mode for a long time. If a change to the connected mode happens, the UE 305 should consume a large amount of resources for transmitting the logged measurement information. Therefore, the eNB 310 determines whether to request a report of the MDT measurement information in consideration of a current radio capacity status or the like.

If it is determined that the channel measurement information logged by the UE 305 is useful, the eNB 310 requests the MDT measurement information through a UEInformationRequest message at step 380. When this message is received from the eNB 310, the UE 305 triggers transmission of the logged MDT measurement information at step 385. Normally since the logged MDT measurement information has a low necessity of urgent transmission, it is required to transmit the MDT measurement information in consideration of priorities of other RRC messages and data.

At step 390, the UE 305 transmits a UEInformationResponse message containing the MDT measurement information to the eNB 310. Once transmitted to the eNB, the UE 305 may delete the MDT measurement information.

Hereinafter, in order to describe a process of UE for reporting measurement information in an embodiment of the present invention, a process of connection establishment between UE and a network will be discussed.

The UE performs an RRC connection establishment process so as to establish a connection with the eNB. The RRC connection establishment is made through an exchange of three RRC messages between the UE and the eNB.

Firstly, the UE transmits an RRC connection request message to the eNB so as to trigger the RRC connection establishment. If the RRC connection establishment is permissible for the UE, the eNB transmits an RRC connection setup message to the UE. The RRC connection setup message contains basic configuration information required for connection.

If the RRC connection establishment is impermissible, the eNB transmits an RRC connection reject message to the UE. Normally in case the capacity of a cell currently controlled by the eNB is saturated, the eNB may limit a new connection through the RRC connection reject message and instead guide a connection to other frequency or other RAT (Radio Access Technology). The UE that receives the RRC connection setup message from the eNB transmits an RRC connection setup complete message to the eNB and thus finishes the RRC connection establishment process.

If the UE logs measurement information and system information in case of a failure in the RRC connection establishment for the purpose of MDT and then reports the logged information to the eNB after a success in the RRC connection establishment, the eNB may use it usefully for the optimization of a radio network.

Accordingly, the present invention proposes an embodiment, in case of a failure in RRC connection establishment, in which the UE logs useful information associated with a connection failure and then reports this to the eNB. The UE operation in this invention has the following features.

According to an embodiment of this invention, the UE logs measurement information associated with a failure in RRC connection establishment with a Selected PLMN when a predetermined timer, preferably T300 timer, expires.

According to an embodiment of this invention, if the UE has measurement information logged at a failure in RRC connection establishment, and if a current RPLMN (Registered PLMN) received from the network in the RRC connection establishment process is identical to the Selected PLMN logged by the UE, the UE transmits, to the eNB, an RRC connection setup complete message that contains an indication that indicates the presence of the measurement information associated with a connection failure.

Additionally, according to an embodiment of this invention, if the UE has measurement information logged at a failure in RRC connection establishment, and if a current RPLMN (Registered PLMN) received from the network in the RRC connection establishment process is identical to the Selected PLMN logged by the UE, and further if a request for measurement information associated with a connection failure is received from the eNB, the UE transmits the measurement information associated with a connection failure to the eNB.

According to typical MDT technique, in case MDT is performed in the idle mode, the UE has already received configuration information for MDT operation from the eNB in the connected mode. The configuration information contains a list of PLMNs, i.e., an MDT PLMN list, to which the UE can report the logged MDT information.

The UE reports measurement information collected and logged in the idle mode to the eNB in the connected mode, based on the configuration information, only when a current RPLMN (Registered Public Land Mobile Network) is included in the MDT PLMN list. This is for preventing network information about a specific operator from being reported to any other operator.

Contrary to typical MDT technique, the UE can have no effective MDT PLMN list from the eNB in case of a failure in RRC connection establishment. The reason is that the UE cannot receive the MDT PLMN list from the eNB in the state of no connection with the eNB before RRC connection establishment. Therefore, it is needed to define whether to report information logged by the UE to any PLMN according to any criterion when RRC connection establishment is failed.

In an embodiment of this invention, it is possible to select a specific PLMN to which the UE should send a report, using a Selected PLMN of the UE. Namely, it is possible to log the Selected PLMN in case of a failure in RRC connection establishment with a network, to log measurement information at the time point of a connection failure, and then to report the measurement information to the network when any RPLMN received in an RRC connection establishment process is identical to the logged Selected PLMN.

Here, a PLMN is the identification of indicating a single radio network and is used mainly for identifying a network of the same operator or any other operator. Additionally, RPLMN indicates a specific PLMN which can offer a service to the UE. A related setup process is as follows.

The eNB broadcasts a PLMN list, being offered by the eNB, through SIB1 (SystemInformationBlockType1). The PLMN list may be offered up to six at maximum. The UE receiving the PLMN list notifies it to an upper layer thereof, i.e., NAS (Non-Access Stratum). Considering HPLMN (Home PLMN) or HEPLMN and any other information owned by the UE, the NAS chooses the Selected PLMN from the PLMN list. The Selected PLMN indicates a specific PLMN to which the UE desires to connect.

The UE notifies the Selected PLMN to MME (Mobility Management Entity) via the eNB, and the MME offers information about RPLMN and ePLMN (equivalent PLMN) to the UE in consideration of the Selected PLMN. The Selected PLMN is indicated as the RPLMN in a general case, and optionally one or more ePLMNs playing the same role as the RPLMN are offered. The UE can perform a normal communication only after receiving the RPLMN.

Therefore, if RRC connection establishment is failed, the UE neither can transmit the Selected PLMN to the MME via the eNB nor can receive the RPLMN from the MME. As applied to MDT, this means that the eNB cannot provide the UE with PLMN information that allows a report using the MDT PLMN list.

Accordingly, in an embodiment of this invention, the UE logs the Selected PLMN when a failure in RRC connection establishment happens. The logged Selected PLMN may be any PLMN identical to HPLMN or PLMN in the PLMN list that can be offered by the eNB. Thus, this is less strict than case of using the MDT PLMN list, but it may be helpful to prevent the UE from reporting logged information to the eNB of any other operator with no agreement.

Thereafter, if the UE succeeds in RRC connection establishment and receives the RPLMN from the MME, the UE compares the RPLMN with the logged Selected PLMN. If the RPLMN is identical to the Selected PLMN, the UE notifies the presence of information logged at a failure in RRC connection establishment to the eNB and, if there is a request of the eNB, reports this to the eNB.

Figure 4:
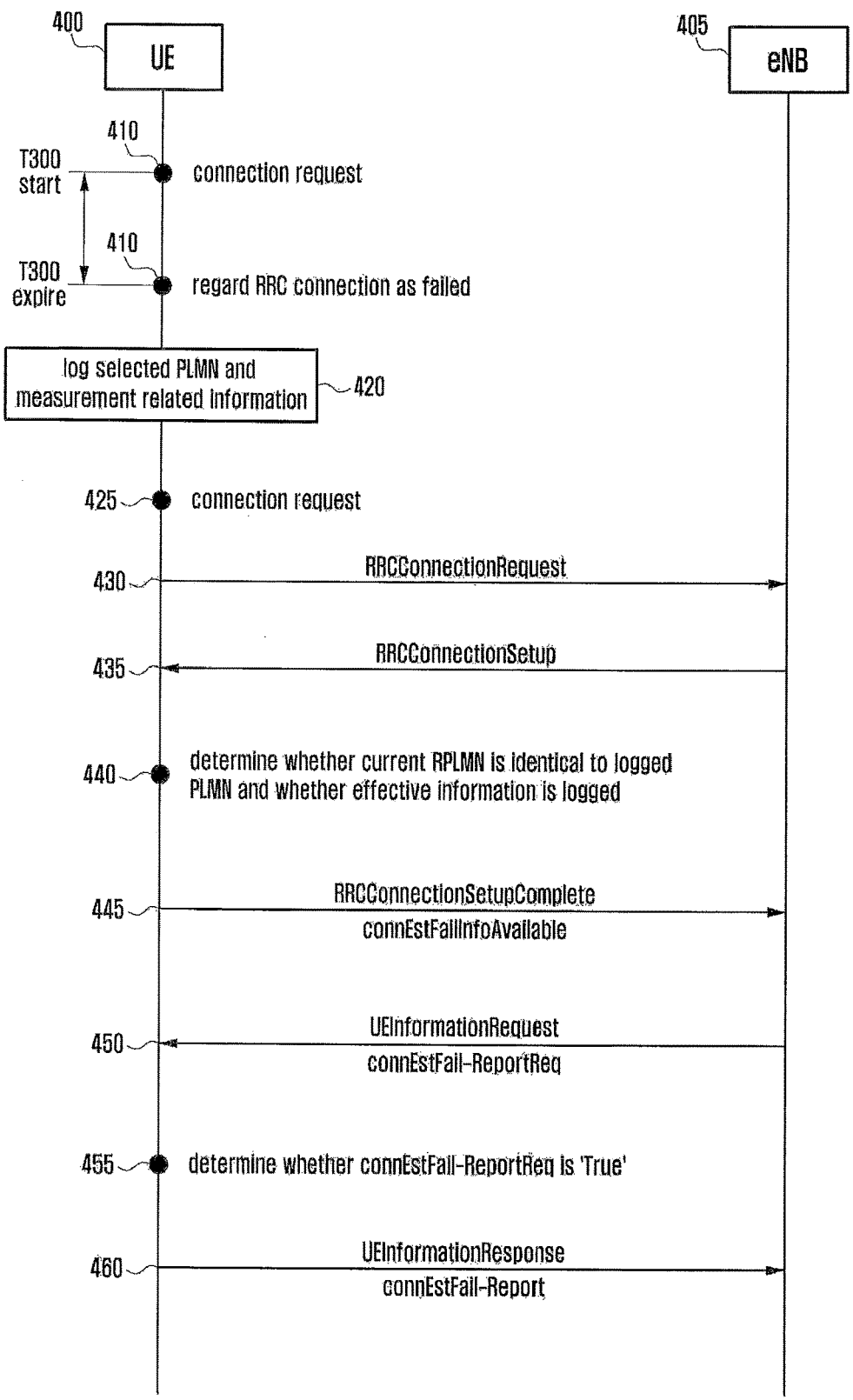
FIG. 4 is a diagram illustrating a flow of operations at a terminal and a base station in accordance with an embodiment of the present invention.

FIG. 4 is a diagram illustrating a flow of operations at a terminal and a base station in accordance with an embodiment of the present invention.

Referring to FIG. 4, UE 400 triggers a connection request at step 410. At this time, the UE 400 transmits an RRC connection request message to eNB 405 and also starts a predetermined T300 timer. If no operation associated with RRC connection happens until the T300 timer expires, e.g., if the UE 400 fails to receive an RRC connection setup or RRC connection reject message from the eNB 405, or if no cell reselection happens, or if no connection request cancel happens from an upper layer, the UE regards RRC connection establishment as failed at step 415.

Next, at step 420, the UE logs information associated with a failure in RRC connection with a current Selected PLMN. This logged information associated with a connection failure is composed of measurement information about a serving cell and neighbor cells when a failure in RRC connection establishment happens, and any other information indicating a failure cause, including at least one of the followings.

A channel measurement value of a serving cell measured most recently at the time point when a failure happens A channel measurement value of neighbor cells measured most recently at the time point when a failure happens ECGI (EUTRAN Cell Global ID) or PCI (Physical Cell ID) information about a serving cell UE location information Occurrence or not of any problem in RACH (Random Access Channel) until the T300 timer expires Among the above information associated with a connection failure, random access related information will be described briefly as follows.

The UE performs a random access process in RRC connection establishment. This is for synchronizing an uplink with a serving cell and for transmitting a related RRC message. The random access process is composed of total four steps.

At the first step, the UE transmits a random access preamble to the eNB. At the second step, the eNB receiving the random access preamble transmits a random access response message. The random access response message includes information for synchronization, scheduling information to be used by the UE at the third step, a temporary UE ID value, and the like. At the third step, the UE transmits a message 3 (msg 3), which includes an RRC connection request in case the UE performs RRC connection establishment. At the fourth step, the eNB transmits, to the UE, a message indicating that the UE has successfully performed the random access process through a competition.

As discussed hereinbefore, since the random access process occupies an importance portion in RRC connection establishment, occurrence or not of RACH problem before the expiration of the T300 timer may be useful information for indicating a failure cause.

Referring to FIG. 4 again, after a failure in RRC connection establishment, the UE 400 triggers again the connection request at step 425. At step 430, the UE 400 transmits the RRC connection request message to the eNB 405. At step 435, the eNB 405 transmits the RRC connection setup message to the UE 400.

At step 440, if the logged Selected PLMN value is identical to a current RPLMN, and if there is effective information logged at a failure in RRC connection establishment, the UE 400 triggers a connEstFailInfoAvailable IE (Information Element) to be included in an RRC connection setup complete message to be transmitted to the eNB 405. The connEstFailInfoAvailable IE is an indication for notifying the eNB 405 that the UE 400 has any logged information associated with a connection failure. At step 445, the UE 400 transmits the RRC connection setup complete message including the connEstFailInfoAvailable IE to the eNB 405.

At step 450, if it is determined that there is a need to receive information associated with a connection failure from the UE, the eNB 405 transmits a UE information request message including a connEstFail-ReportReq IE to the UE 400. The connEstFail-ReportReq IE is used for requesting a report of measurement information to the UE 400, and the eNB 405 determines a setting value of the connEstFail-ReportReq IE as 'true' and includes it in the UE information request message.

At step 455, if the logged Selected PLMN value is identical to a current RPLMN, and if there is effective information logged at a failure in RRC connection establishment, and further if the connEstFail-ReportReq IE received from the eNB 405 is set as 'true', the UE 400 includes logged measurement information associated with a connection failure in a connEstFail-Report IE. At step 460, the UE 400 transmits, to the eNB 405, the UE information response message including the connEstFail-Report IE.

Figure 5:
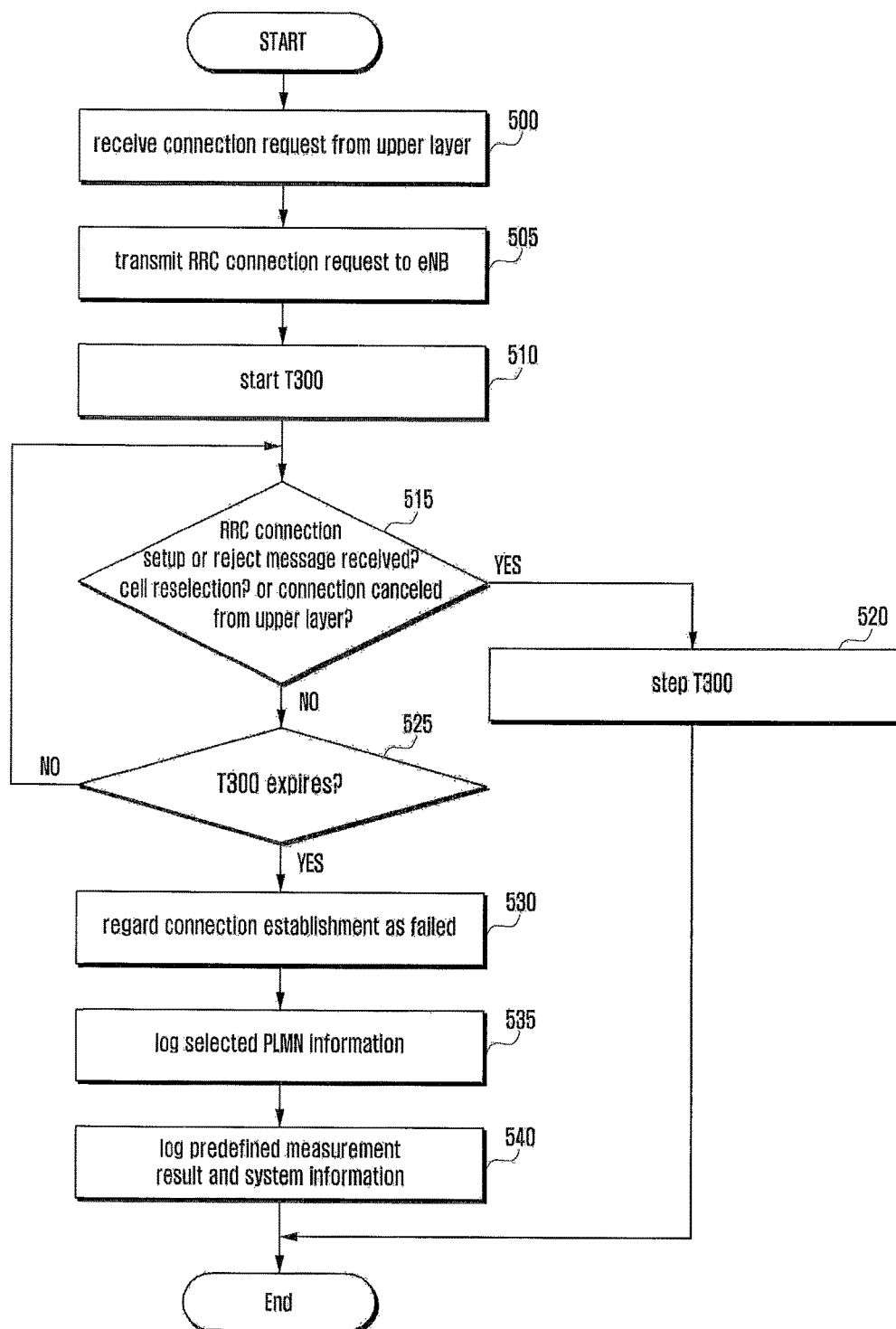
FIG. 5 is a diagram illustrating operations of a terminal in case of a failure in RRC connection establishment.

FIG. 5 is a diagram illustrating operations of a terminal in case of a failure in RRC connection establishment.

Referring to FIG. 5, the UE receives a connection request from an upper layer at step 500. At step 505, the UE transmits the RRC connection request message to the eNB. At step 510, the UE starts the T300 timer.

At step 515, the UE determines whether the RRC connection setup or RRC connection reject message is received from the eNB, whether a cell reselection happens, or whether connection establishment is cancelled at the upper layer. If one of the above conditions is satisfied, the UE stops the T300 timer at step 520 and then performs predetermined operations based on current standard technology.

If no condition given above is satisfied, the UE determines at step 525 whether the T300 timer expires. If the timer expires, the UE regards the RRC connection establishment as failed at step 530. Then the UE logs a current Selected PLMN at step 535. Additionally, at step 540, the UE logs the above-discussed useful information associated with a connection failure (VarConnEstFailReport).

Specifically, the logged information associated with a connection failure may include identification information of a serving cell in which a connection failure happens (failedCellID), recent channel measurement information such as RSRP (Reference Signal Received Power) and RSRQ (Reference Signal Received Quality) of a serving cell in which a connection failure happens (measResultFailedCell), channel measurement information of neighbor cells (measResultNeighCells), location information about the UE 400, the number of preambles sent in connection with a random access failure (numberOfPreamblesSent), a success or not of transmission contention resolution (contentionDetected), and a use or not of maximum power (maxTxPowerReached).

Figure 6:
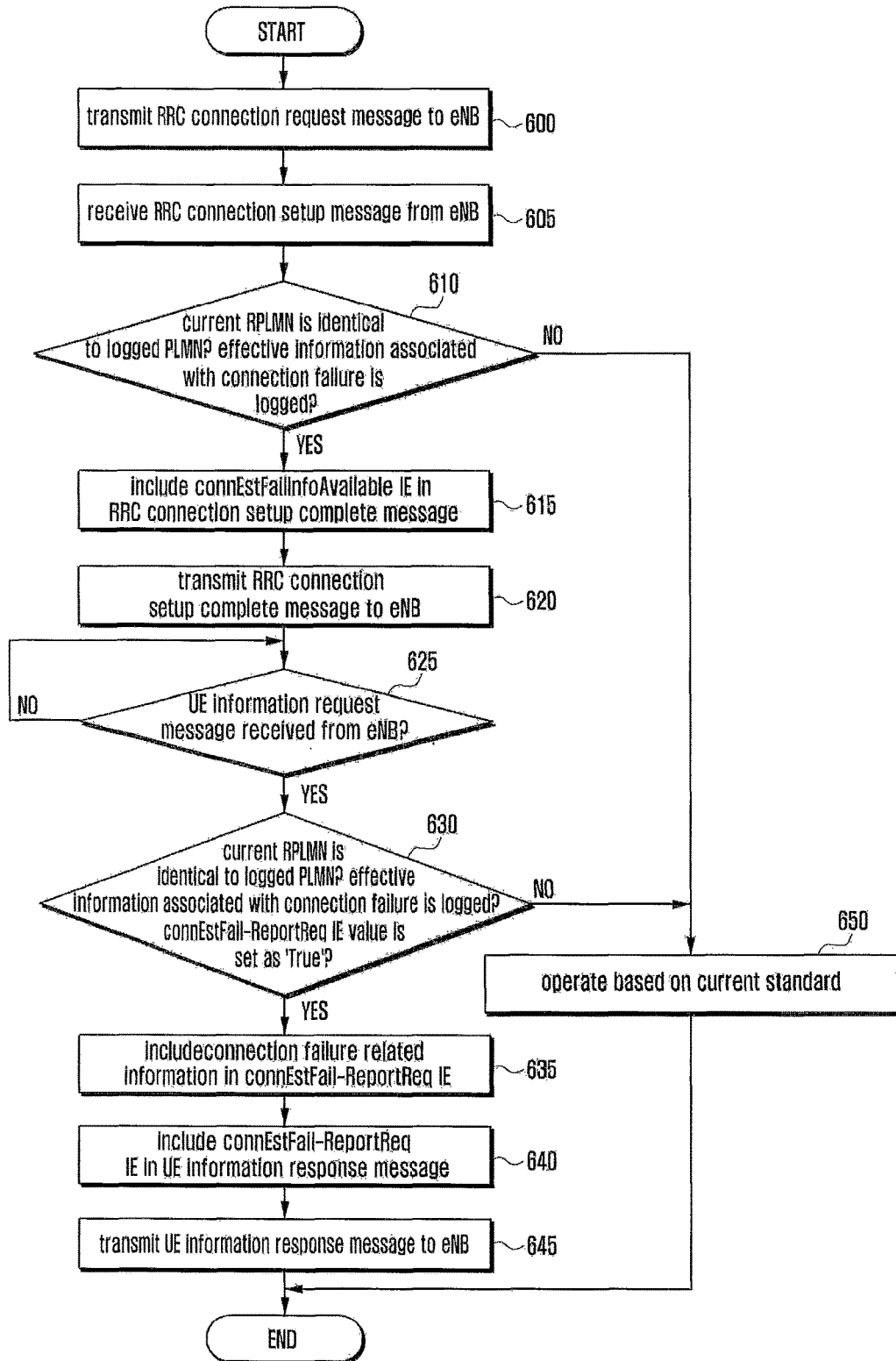
FIG. 6 is a diagram illustrating operations of a terminal for reporting, to a base station, information logged in case of a failure in RRC connection establishment.

FIG. 6 is a diagram illustrating operations of a terminal for reporting, to a base station, information logged in case of a failure in RRC connection establishment.

Referring to FIG. 6, the UE transmits the RRC connection request message to the eNB at step 600. At step 605, the UE receives the RRC connection setup message from the eNB. At step 610, the UE determines whether a current RPLMN is identical to the logged Selected PLMN and whether there is effective information logged at a failure in RRC connection establishment.

If the above two conditions are satisfied, the UE includes at step 615 the connEstFailInfoAvailable IE in the RRC connection setup complete message. Otherwise, the above IE is not included. At step 620, the UE transmits the RRC connection setup complete message to the eNB. At step 625, the UE determines whether the UE information request message is received from the eNB. At step 630, the UE determines whether a current RPLMN is identical to the logged Selected PLMN, whether there is effective information logged at a failure in RRC connection establishment, and whether the connEstFail-ReportReq IE received from the eNB 405 is set as 'true'.

The above three conditions are satisfied, the UE includes logged information associated with a connection failure in the connEstFail-Report IE at step 635. At step 640, the UE includes the connEstFail-Report IE in the UE information response message. At step 645, the UE transmits the UE information response message to the eNB.

Figure 7:
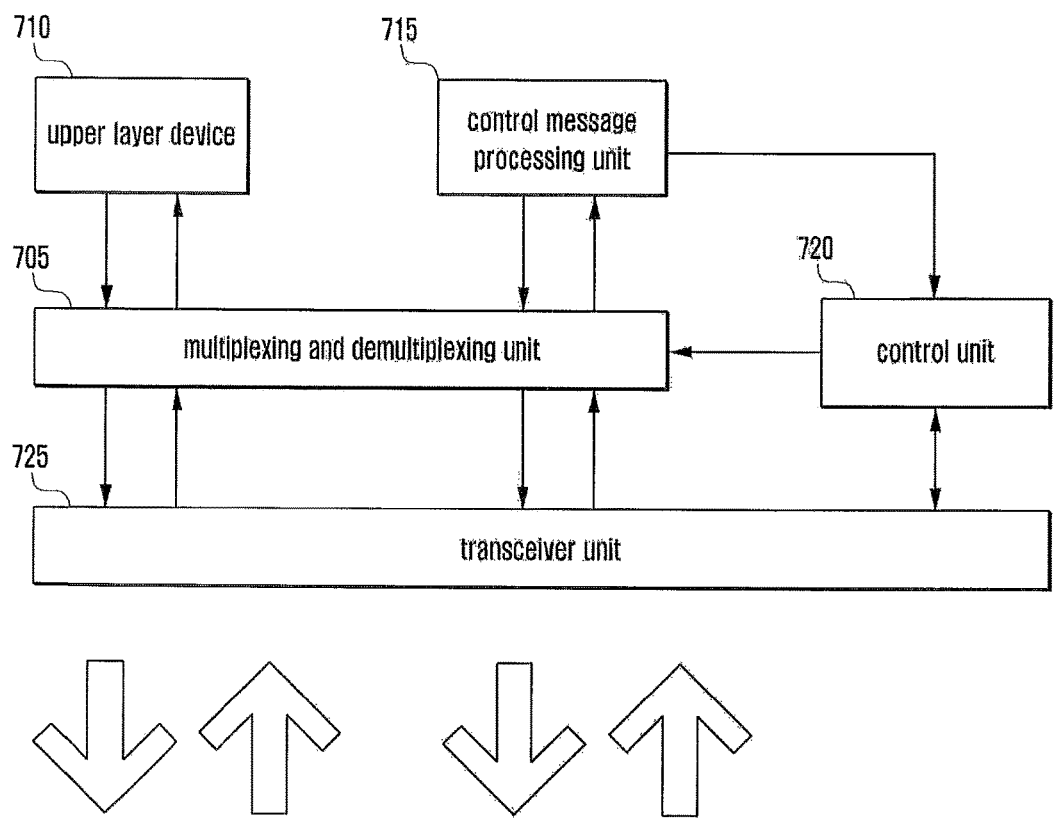
FIG. 7 is a block diagram illustrating an internal structure of a terminal.

FIG. 7 is a block diagram illustrating an internal structure of a terminal.

As shown in FIG. 7, the terminal, also referred to as UE hereinbefore, according to an embodiment of the present invention may include a transceiver unit 725, a control unit 720, a multiplexing and demultiplexing unit 705, a control message processing unit 715, and various upper layer devices 710.

Referring to FIG. 7, the terminal transmits or receives data, etc. to or from the upper layer devices 710 and transmits or receives control messages through the control message processing unit 715. Additionally, when a control signal or data is transmitted to the base station, also referred to as eNB hereinbefore, the terminal transmits data through the transmitter 700 after multiplexing through the multiplexing unit 705 under the control of the control unit 720. Also, when a control signal or data is received from the base station, the terminal receives a physical signal through the receiver 700 under the control of the control unit 720, demultiplexes the received signal through the demultiplexing unit 705, and sends it to the upper layer devices 710 or the control message processing unit 715 according to message information.

Meanwhile, although FIG. 7 illustrates that the terminal is composed of a plurality of blocks which perform different functions, this is only one embodiment and not to be considered as a limitation. Alternatively, for example, a function of the demultiplexing unit 705 may be performed by the control unit itself 720.

Figure 8:
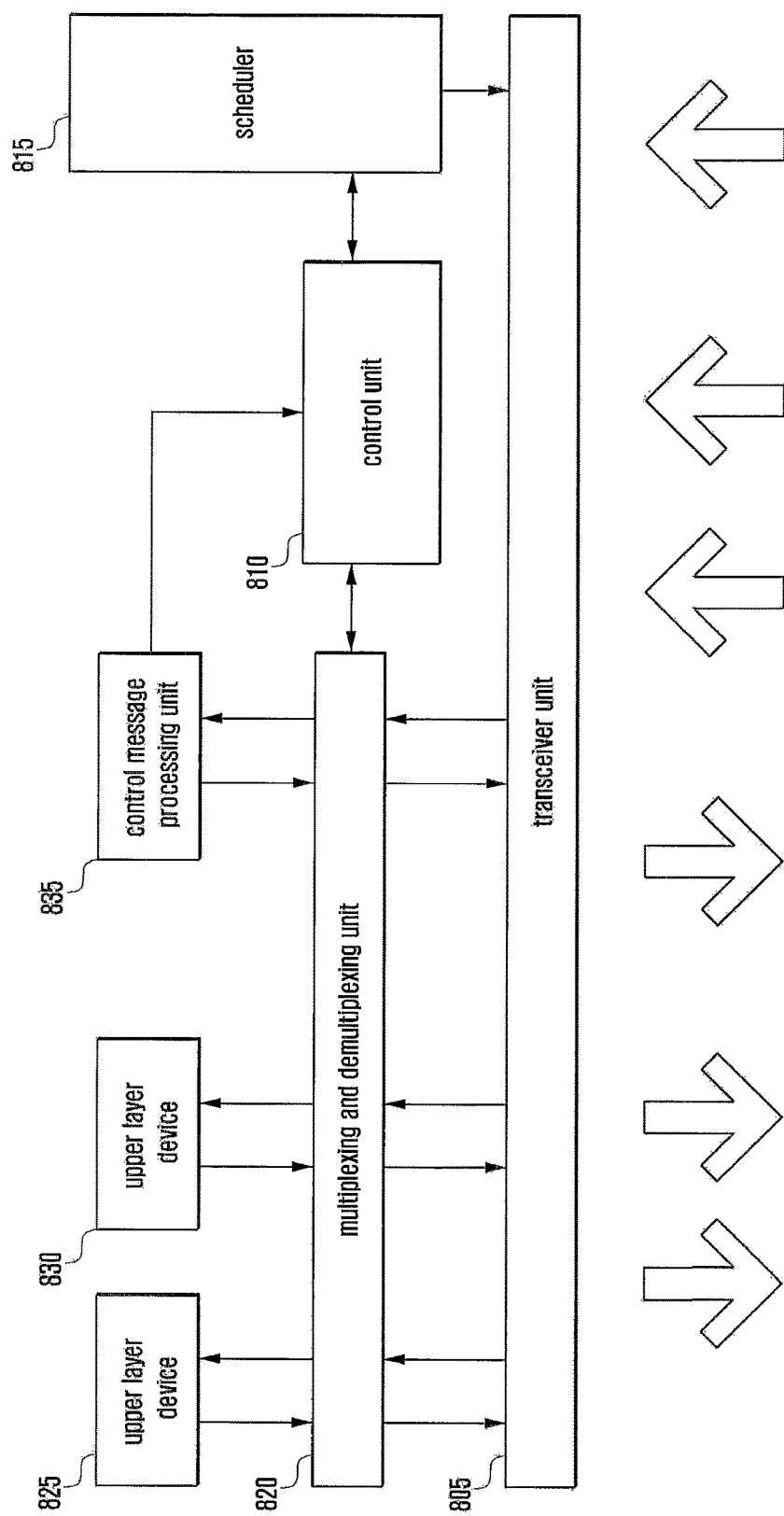
FIG. 8 is a block diagram illustrating an internal structure of a base station.

FIG. 8 is a block diagram illustrating an internal structure of a base station.

As shown in FIG. 8, the base station according to an embodiment of the present invention may include a transceiver unit 805, a control unit 810, a multiplexing and demultiplexing unit 820, a control message processing unit 835, various upper layer processing units 825 and 830, and a scheduler 815.

Referring to FIG. 8, the transceiver unit 805 transmits data and a control signal to the terminal on a forward carrier and receives data and a control signal from the terminal on a backward carrier. In case a plurality of carriers is set, the transceiver unit 805 performs transmission/reception of data and a control signal through the plurality of carriers.

The multiplexing and demultiplexing unit 820 multiplexes data generated from the upper layer processing units 825 and 830 or the control message processing unit 835 or demultiplexes data received through the transceiver unit 805, and then sends it to a suitable one of the upper layer processing units 825 and 830, the control message processing unit 835, or the control unit 810. The control message processing unit 835 processes a control message received from the terminal and then takes a suitable action, or creates a control message to be sent to the terminal and transmits it to a lower layer.

The upper layer processing units 825 and 830 may be configured according to terminals or services, and processes data generated in a user service such as FTP or VoIP to transmit it to the multiplexing and demultiplexing unit 820 or processes data received from the multiplexing and demultiplexing unit 820 to transmit it to an upper layer service application.

The control unit 810 controls the transceiver unit by determining when the terminal transmits data.

The scheduler 815 allocates transmission resources to the terminal at a suitable time point in consideration of a buffer state of the terminal, a channel state, an active time of the terminal, or the like, and enables the transceiver unit to process a signal received from the terminal or to transmit a signal to the terminal.

In the above-discussed embodiments, all steps may be selectively performed or skipped. Additionally, the respective steps in each embodiment may be not always performed in regular order.

While the present invention has been particularly shown and described with reference to an exemplary embodiment thereof, it will be understood by those skilled in the art that various changes in form and details may be made therein without departing from the spirit and scope of this invention as defined by the appended claims.

The invention claimed is:

1. A method for transmitting information by a user equipment (UE) in a wireless communication system, the method comprising:
   transmitting, to a base station, a radio resource control (RRC) connection request message;
   starting a timer based on the RRC connection request message;
   if the timer expires, storing connection establishment failure information including an identity of a cell where connection establishment failure is detected; and
   transmitting, to the base station, a RRC connection setup complete message including first information indicating the UE has the connection establishment failure information if the UE receives a RRC connection setup message and if a public land mobile network (PLMN) associated with the connection establishment failure information is equal to a registered PLMN.

2. The method of claim 1, wherein the timer is stopped if:
   the UE receives the RRC connection setup message or a RRC connection reject message;
   the UE performs a cell reselection; or
   an upper layers abort a RRC connection procedure.

3. The method of claim 1, further comprising:
   receiving, from the base station, an UE information request message including second information indicating the base station requests the connection establishment failure information.

4. The method of claim 1, wherein the connection establishment failure information further comprises at least one of:
   a reference signal received power (RSRP) and a reference signal received quality (RSRQ) of the cell where the connection establishment failure is detected;
   a neighboring cell measurement report;
   a location information of the UE; or
   a random access failure related information.

5. A method for receiving information by a base station in a wireless communication system, the method comprising:
   receiving, from a user equipment (UE), a radio resource control (RRC) connection request message; and
   receiving, from the UE, a RRC connection setup complete message including first information indicating the UE has connection establishment failure information if the base station transmits a RRC connection setup message and if a public land mobile network (PLMN) associated with the connection establishment failure information is equal to a registered PLMN,
   wherein a timer is started based on the RRC connection request message and, if the timer expires, the connection establishment failure information, and
   wherein the connection establishment failure information includes an identity of a cell where connection establishment failure is detected.

6. The method of claim 5, wherein the timer is stopped if:
   the UE receives the RRC connection setup message or a RRC connection reject message;
   the UE performs a cell reselection; or
   an upper layers abort a RRC connection procedure.

7. The method of claim 5, further comprising:
   transmitting, to the UE, an UE information request message including second information indicating the base station requests the connection establishment failure information.

8. The method of claim 5, wherein the connection establishment failure information further comprises at least one of:
   a reference signal received power (RSRP) and a reference signal received quality (RSRQ) of the cell where the connection establishment failure is detected;
   a neighboring cell measurement report;
   a location information of the UE; or
   a random access failure related information.

9. A user equipment (UE) for transmitting information in a wireless communication system, the UE comprising:
   a transceiver; and
   a controller coupled with the transceiver and configured to control to:

transmit, to a base station, a radio resource control (RRC) connection request message, start a timer based on the RRC connection request message, if the timer expires, store connection establishment failure information including an identity of a cell where connection establishment failure is detected, and transmit, to the base station, a RRC connection setup complete message including first information indicating the UE has the connection establishment failure information if the UE receives a RRC connection setup message and if a public land mobile network (PLMN) associated with the connection establishment failure information is equal to a registered PLMN.

10. The UE of claim 9, wherein the timer is stopped if:

the UE receives the RRC connection setup message or a RRC connection reject message;

the UE performs a cell reselection; or an upper layers abort a RRC connection procedure.

11. The UE of claim 9, wherein the controller is further configured to control:

receiving, from the base station, an UE information request message including second information indicating the base station requests the connection establishment failure information.

12. The UE of claim 9, wherein the connection establishment failure information further comprises at least one of:

a reference signal received power (RSRP) and a reference signal received quality (RSRQ) of the cell where the connection establishment failure is detected;

a neighboring cell measurement report;

a location information of the UE; or a random access failure related information.

13. A base station for receiving information in a wireless communication system, the base station comprising:

a transceiver; and a controller coupled with the transceiver and configured to control to:

receive, from a user equipment (UE), a radio resource control (RRC) connection request message, and receive, from the UE, a RRC connection setup complete message including first information indicating the UE has connection establishment failure information if the base station transmits a RRC connection setup message and if a public land mobile network(PLMN) associated with the connection establishment failure information is equal to a registered PLMN, wherein a timer is started based on the RRC connection request message and, if the timer expires, the connection establishment failure information, and wherein the connection establishment failure information includes an identity of a cell where connection establishment failure is detected.

14. The base station of claim 13, wherein the timer is stopped if:

the UE receives the RRC connection setup message or a RRC connection reject message;

the UE performs a cell reselection; or an upper layers abort a RRC connection procedure.

15. The base station of claim 13, wherein the controller is further configured to transmit, to the UE, an UE information request message including second information indicating the base station requests the connection establishment failure information.

16. The base station of claim 13, wherein the connection establishment failure information further comprises at least one of:

a reference signal received power (RSRP) and a reference signal received quality (RSRQ) of the cell where the connection establishment failure is detected;

a neighboring cell measurement report;

a location information of the UE; or a random access failure related information.

* * * * *